United States Patent [19]
Lebryk

[11] 3,890,663
[45] June 24, 1975

[54] METHOD OF FORMING A COTTER KEY HOLE IN A BOLT

[76] Inventor: Matthew J. Lebryk, Rte. 1, Custer, Wis.

[22] Filed: May 6, 1974

[21] Appl. No.: 467,010

[52] U.S. Cl.................................. 10/27 R; 10/20.5
[51] Int. Cl............................................. B23g 9/00
[58] Field of Search ........ 10/14, 20.5, 27 R, 27 PH, 10/27 FS; 85/7, 8.1; 151/5, 6, 31

[56] References Cited
UNITED STATES PATENTS

| 185,633 | 12/1876 | Enochs | 151/31 |
|---|---|---|---|
| 228,161 | 6/1880 | Adlam | 151/31 |
| 340,683 | 4/1886 | Smith | 10/27 R |
| 795,242 | 7/1905 | Weiss | 85/7 |
| 942,226 | 12/1909 | Vernon et al. | 151/31 |
| 2,543,063 | 2/1951 | Rodgers | 10/27 PH |
| 2,674,754 | 4/1954 | Hale | 10/20.5 |

Primary Examiner—C. W. Lanham
Assistant Examiner—E. M. Combs
Attorney, Agent, or Firm—Andrus, Sceales, Starke & Sawall

[57] ABSTRACT

A method of forming a cotter key hole in a bolt stem. The end of the bolt stem is partially split in a longitudinal direction to form a pair of diverging connected sections. The joint between the sections is cut to provide a transverse groove or recess. The connected sections are then crimped together and the transverse groove provides an opening through the stem to receive the cotter key.

4 Claims, 4 Drawing Figures

METHOD OF FORMING A COTTER KEY HOLE IN A BOLT

BACKGROUND OF THE INVENTION

It is often desirable to lock a nut on a threaded bolt to prevent the nut from unthreading due to vibration of flexing of the connected parts. In the past a positive lock has been provided by utilizing a cotter key which is inserted through a hole in the stem of the bolt outwardly of the nut. The cotter key provides a positive lock against unthreading of the nut, but requires a small diameter hole in the bolt stem. In the past, it has been the practice to form the cotter key hole by drilling, but due to the small diameter of the drill bit, the heat and friction encountered in the drilling operation tend to quickly destroy the temper of the bit.

SUMMARY OF THE INVENTION

The invention is directed to an improved method of forming a cotter key hole in a bolt stem. According to the invention, the end of the bolt stem is partially split in a longitudinal direction to form a pair of diverging connected sections. Following the splitting the joint between the diverging sections is cut with a saw blade to form a transverse groove or enlargement and subsequently the sections are crimped together with the groove providing a transverse hole through the bolt stem. Subsequently the end of the bolt stem can be threaded.

The invention provides an improved method of forming a small diameter hole in the end of the bolt stem and eliminates the drilling operation as has been used in the past.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
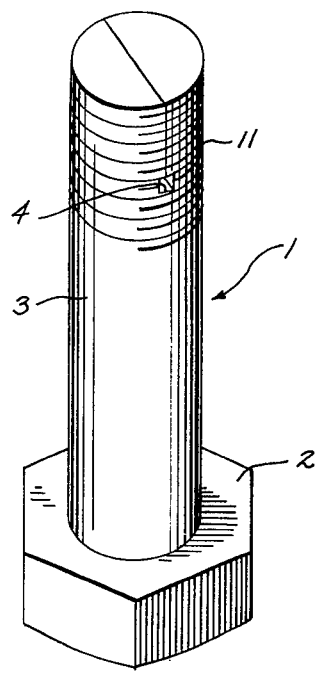
FIG. 1 is a perspective view of a bolt having a cotter key hole formed by the method of the invention.

FIG. 1 illustrates a standard bolt 1 having a hexagonal head 2 and a stem or shank 3. A hole 4 is formed in the end portion of the shank 3 and is adapted to receive a cotter key, not shown.

Figure 2:
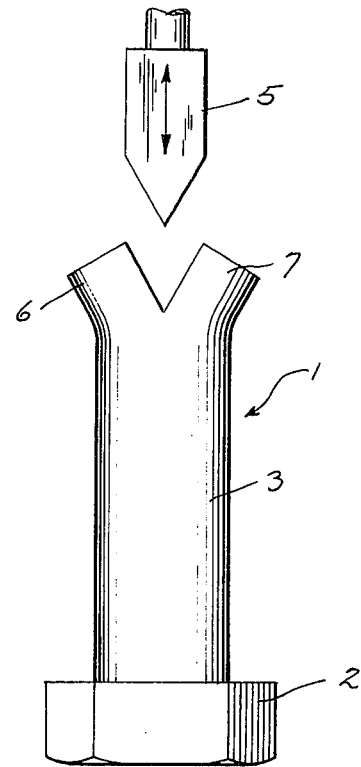
FIG. 2 is a schematic view of the bolt having the end split by power chisel.
Figure 3:
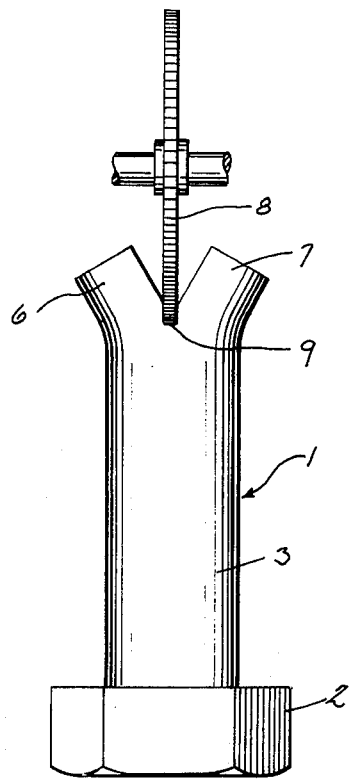
FIG. 3 is a view similar to FIG. 2 showing a saw cut being made at the joint between the split sections of the bolt.
Figure 4:
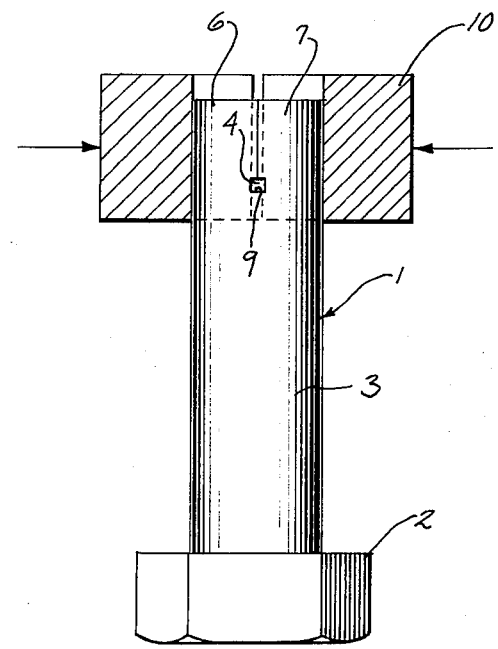
FIG. 4 is a view similar to FIG. 1 showing the split sections being crimped back together by power tool.

The method of forming the hole 4 in the shank 3 of the bolt is illustrated schematically in FIGS. 2–4. In the initial operation, the end of the shank 3 is split by a power operated chisel 5 or similar tool, into a pair of diverging connecting sections 6 and 7. Depending on the metal of the bolt, the diameter of the shank and the capacity of the chisel, the bolt can be either heated or can be at room temperature when the end is split, as shown in FIG. 2.

Following the splitting operation, the joint between the sections 6 and 7 is cut with a metal saw blade 8 to provide a transverse groove or recess 9 that extends transversely of the shank.

While the drawing illustrates a rotary saw blade forming a groove 9 it is contemplated that other types of cutting devices, such as a reciprocating blade, or the like can be used to provide the groove 9 at the joint between the split sections 6 and 7.

After the groove 9 has been formed in the shank, the sections 6 and 7 are crimped back to their original condition by a power clamp, indicated schematically by 10, or other power device. The crimping or deforming of the sections 6 and 7 back to their original condition can be done when the metal is either heated or at room temperature. After the sections 6 and 7 have been returned to their original configuration, the end of the shank can be threaded as illustrated by the thread 11.

It is preferred that the threading operation be done after forming of the cotter key hole 4, because splitting the end of a threaded bolt may deform the thread so that it would be necessary to touch-up the thread after the split sections are crimped back to their original condition. In view of this, it is preferred to thread the end of the shank after the cotter key hole 4 has been formed.

The invention provides a convenient method of forming a cotter key hole in a small diameter bolt which eliminates the difficulties normally encountered when using a drill bit to form the cotter key hole.

Various modes of carrying out the invention are contemplated as being within the scope of the following claims particularly pointing out and distinctly claiming the subject matter which is regarded as the invention.

I claim:

1. A method of forming a transverse hole in the shank of a bolt, comprising the steps of longitudinally splitting the end of the bolt shank into two diverging connected sections, said sections being connected at a juncture and each connected section having an inner surface facing the inner surface of the other connected section, inserting a cutting tool longitudinally between the two diverging connected sections and cutting a transverse groove at said juncture, and crimping the two sections together to bring the inner surfaces into contiguous relationship and reform the shank with the groove comprising a transverse hole extending through the reformed shank.

2. The method of claim 1 and including the step of threading the external end portion of the reformed shank.

3. The method of claim 1, wherein the groove is formed by cutting with a saw blade.

4. The method of claim 1, wherein the end of the shank is split by a chisel.

* * * * *